United States Patent
Liu et al.

(10) Patent No.: US 10,767,737 B2
(45) Date of Patent: Sep. 8, 2020

(54) SMART SELF-ADAPTIVE PLANETARY TRANSMISSION DEVICE WITH SMALL TOOTH NUMBER DIFFERENCE

(71) Applicant: Cisdi Engineering Co., Ltd., Chongqing (CN)

(72) Inventors: Jingya Liu, Chongqing (CN); Shusheng Wang, Chongqing (CN); Xiaohua Peng, Chongqing (CN); Wenjun Dai, Chongqing (CN)

(73) Assignee: CISDI ENGINEERING CO., LTD, Chongqing (CN)

( * ) Notice: Subject to any disclaimer, the term of this patent is extended or adjusted under 35 U.S.C. 154(b) by 76 days.

(21) Appl. No.: 16/073,765

(22) PCT Filed: Oct. 10, 2016

(86) PCT No.: PCT/CN2016/101621
§ 371 (c)(1),
(2) Date: Jul. 27, 2018

(87) PCT Pub. No.: WO2017/157007
PCT Pub. Date: Sep. 21, 2017

(65) Prior Publication Data
US 2018/0372189 A1    Dec. 27, 2018

(30) Foreign Application Priority Data
Mar. 15, 2016    (CN) .......................... 2016 1 0144689

(51) Int. Cl.
F16H 3/46    (2006.01)
F16H 3/70    (2006.01)
F16H 57/023    (2012.01)
F16H 57/021    (2012.01)

(52) U.S. Cl.
CPC ................. *F16H 3/70* (2013.01); *F16H 3/46* (2013.01); *F16H 57/021* (2013.01); *F16H 57/023* (2013.01)

(58) Field of Classification Search
None
See application file for complete search history.

(56) References Cited

U.S. PATENT DOCUMENTS 3,574,489 A * 4/1971 Pierrat .................... F01C 1/103
418/61.3
5,505,668 A * 4/1996 Koriakov-Savoysky ....................
F16H 1/32
475/180

(Continued)

*Primary Examiner* — Justin Holmes
(74) *Attorney, Agent, or Firm* — Michael D. Eisenberg (57) ABSTRACT

A planetary transmission device with a small tooth number difference for implementing smart workload self-adaptation comprises a left planetary gear, a right planetary gear, a left-end disk, a right-end disk, a housing and a connection member. One end of the connection member axially run through the left planetary gear and the right planetary gear. End parts of both ends of the connection member are fixedly connected to the left-end disk and the right-end disk respectively. By means of a force closure mechanism, the transmission device can automatically and steplessly adjust a transmission ratio and an output rotation speed according to a change in load without depending on a measurement md control system, md has a simple structure and low costs.

9 Claims, 3 Drawing Sheets

(56) References Cited

U.S. PATENT DOCUMENTS

| | | | | |
|---|---|---|---|---|
| 2003/0216213 A1* | 11/2003 | Yamamoto | ................ | F16H 1/28 475/330 |
| 2013/0203544 A1* | 8/2013 | Kobayashi | ................ | F16H 1/32 475/169 |
| 2013/0203545 A1* | 8/2013 | Yao | ........................ | F16H 13/08 475/183 |
| 2015/0184584 A1* | 7/2015 | Kuroda | ................ | F02B 37/186 475/149 |

\* cited by examiner

SMART SELF-ADAPTIVE PLANETARY TRANSMISSION DEVICE WITH SMALL TOOTH NUMBER DIFFERENCE

TECHNICAL FIELD

The present invention relates to the field of planetary transmission with a small tooth number difference, and particularly to a planetary transmission device with a small tooth number difference for implementing smart workload self-adaptation

BACKGROUND

Planetary transmission with a small tooth number difference has the advantages of large transmission ratio, small volume, high transmission efficiency, large bearing capability and the like, and has been widely used in the fields of metallurgy, mines, robots, aerospace and weapon equipment. The existing planetary transmission with a small tooth number difference has a constant transmission ratio. When the workload is changed and output rotation speed shall be adjusted to ensure the optimal operation state of the equipment, the rotation speed of a drive device is regulated in an electrical control manner to adapt to the change. This manner mainly relies on measurement and control, causing complex system structure and high cost. However, a self-adaptive mechanism realizes self-adaptive adjustment for external change operating conditions depending on self structural characteristics without measurement and control, and reliably completes expected working requirements. The current self-adaptive mechanism mainly includes some pressurization devices, holders, mechanical grippers, etc. composed of linkage structures and ordinary gears. A planetary transmission device with a small tooth number difference capable of realizing self-adaptation is absent.

SUMMARY

In view of the above defects in the prior art, the purpose of the present invention is to provide a smart self-adaptive planetary transmission device with a small tooth number difference, used to solve the defects that the transmission device in the prior art is adaptively regulated by the measurement and control system, the transmission device itself cannot automatically adjust output rotation speed according to load change, the structure is complex, the cost is high, etc.

To realize the above purpose and other related purposes, the present invention provides a smart self-adaptive planetary transmission device with a small tooth number difference, comprising a left planetary gear, a right planetary gear, a left-end disk, a right-end disk, a housing and a connection member, wherein one end of the connection member axially runs through the left planetary gear and the right planetary gear; end parts of both ends of the connection member are fixedly connected to the left-end disk and the right-end disk respectively; the left planetary gear is engaged with both the tooth profile on the left-end disk and the tooth profile on the housing; the right planetary gear is engaged with the tooth profile on the right-end disk and the tooth profile on the housing; and the left planetary gear, the right planetary gear, the left-end disk, the right-end disk and the housing form a force closure mechanism.

By means of the force closure mechanism formed by the left planetary gear, the right planetary gear, the left-end disk, the right-end disk and the housing, the transmission device can automatically and steplessly adjust the transmission ratio and the output rotation speed according to a change in load without depending on a measurement and control system, and has a simple structure, high transmission efficiency and low cost.

Further, the smart self-adaptive planetary transmission device with the small tooth number difference further comprises an input shaft and an output shaft; the input shaft is supported on the right-end disk through a first end surface bearing, and the input shaft is in transmission connection with the right planetary gear through a tumbler bearing; and the output shaft is supported on the left-end disk through the first end surface bearing, and the output shaft is in transmission connection with the left planetary gear through the tumbler bearing.

Further, an isolating sleeve is arranged between the tumbler bearing and the first end surface bearing.

Further, the housing, the left planetary gear and the right planetary gear are duplex gears.

Further, eccentric directions of the duplex gears on the left planetary gear and the right planetary gear have a difference of 180°.

Further, gear tooth profiles of the left-end disk and the right-end disk are disposed on end surfaces.

Further, the duplex gears on the left planetary gear and the right planetary gear are external gears, and the gears disposed on the end surfaces of the left-end disk and the right-end disk are internal gears; or the gears on the left planetary gear engaged with the left-end disk and the gears on the right planetary gear engaged with the right-end disk are internal gears, and the gears disposed on the end surfaces of the left-end disk and the right-end disk are external gears.

Further, the connection member is a connection pin; one end of the connection pin axially runs through the left planetary gear and the right planetary gear; and both ends of the connection pin are fixedly connected to the left-end disk and the right-end disk respectively.

Further, the left-end disk and the right-end disk are respectively supported on the internal gears of the housing through a second end surface bearing.

Further, tooth number relationships of the gears on the force closure mechanism are:

$$(z_1 z_{23} - z_{21} z_{32})(z_4 - z_{54})(z_{54} + z_{53}) = (z_4 z_{53} - z_{54} z_{35})(z_1 - z_{31})(z_{21} + z_{23});$$

$$z_{32} = z_1 - z_{21} + z_{23};$$

$$z_{35} = z_4 - z_{54} + z_{53};$$

wherein $z_1$ is the tooth number of the gears on the right-end disk; $z_{21}$ is the tooth number of the gears, engaged with the right-end disk, on the right planetary gear; $z_{23}$ is the tooth number of the gears, engaged with the housing, on the right planetary gear; $z_{32}$ is the tooth number of the gears, engaged with the right planetary gear, on the housing; $z_{35}$ is the tooth number of the gears, engaged with the left planetary gear, on the housing; $z_4$ is the tooth number of the gears on the left-end disk; $z_{53}$ is the tooth number of the gears, engaged with the housing, on the left planetary gear; and $z_{54}$ is the tooth number of the gears, engaged with the left-end disk, on the left planetary gear. As stated above, compared with the prior art, the present invention has the following beneficial effects:

(1) Under the condition that the rotation speed and the torque of a drive device are changed, the transmission device can automatically adjust the transmission ratio and output rotation speed according to the change in the workload;

(2) Self-adaptation of the transmission device only depends on the characteristics of the mechanism itself, independent of the measurement and control system, thereby realizing simple structure, low cost and high reliability;

(3) The transmission ratio of the transmission device is continuously variable and the speed adjustment manner is stepless speed change, thereby realizing smooth transmission;

(4) The transmission device has overload self-protection function. When the workload exceeds the largest output load, the output shaft stops rotation and is shut down; meanwhile, the rotation speed and the torque of the drive device keep unchanged, thereby achieving automatic protection;

(5) The transmission device has self-recovery function. After the device is automatically stopped due to overload, when the workload is less than the largest output load, the operation can be automatically recovered to realize normal transmission.

DESCRIPTION OF PART MARKS

H1 input shaft
H2 output shaft
1 right-end disk
2 right planetary gear
3 housing
4 left-end disk
5 left planetary gear
6 tumbler bearing
7 first end surface bearing
8 connection member
9 screw
10 spacer
11 second end surface bearing
12 sealing member
13 isolating sleeve

DETAILED DESCRIPTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention.

See FIG. 1 to FIG. 4. It should be indicated that, the figures provided in the present embodiment only exemplarily explain the basic conception of the present invention, so only show the components associated with the present invention, and are not drawn in accordance with component number, shapes and sizes in actual implementation. Forms, number and proportions of the components in the actual implementation can be freely changed, and component layout forms may also be more complex. Structures, proportions and sizes drawn in the figures of the description are only used to match with the disclosure in the description for those skilled in the art to understand and read, not intended to limit implementation of the present invention, so have no technical material meaning. Any structural modification, proportional change and adjustment of sizes shall still be included in the scope of the technical contents revealed in the present invention without affecting the effects generated by the present invention and the purposes achieved by the present invention. Meanwhile, terms such as "upper", "lower", "left", "right", "middle", "an", etc. cited in the description are only used for clear illustration, not intended to limit the implementation scope of the present invention. Change or adjustment of relative relationships shall be included in the implementation scope of the present invention without substantially changing the technical contents.

Figure 1:
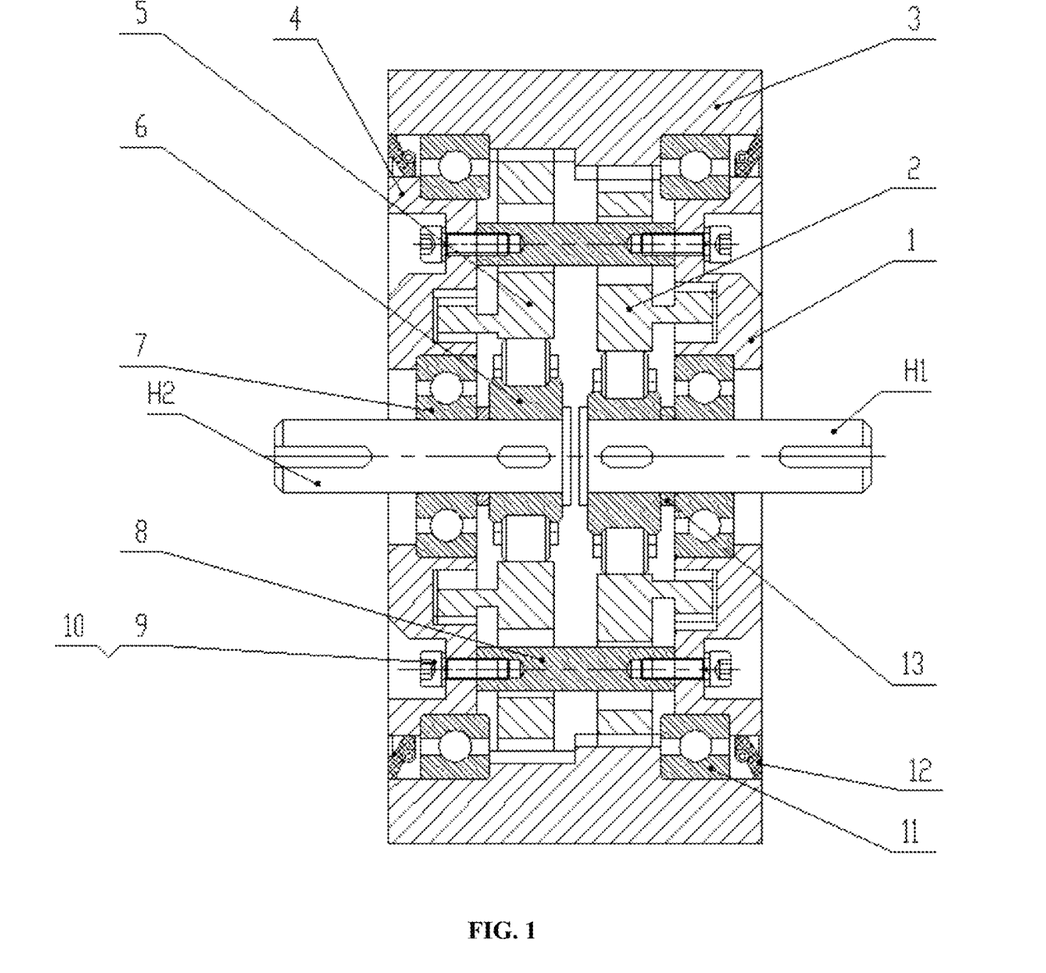
FIG. 1 is a structural schematic diagram of an embodiment of the present invention.

As shown in FIG. 1, the smart self-adaptive planetary transmission device with a small tooth number difference in the present invention comprises a left planetary gear 5, a right planetary gear 2, a left-end disk 4, a right-end disk 1, a housing 3 and a connection member 8, wherein the left planetary gear 5, the right planetary gear 2, the left-end disk 4, the right-end disk 1 and the housing 3 form a force closure mechanism. The smart self-adaptive planetary transmission device with the small tooth number difference further comprises an input shaft H1 and an output shaft H2; and the input shaft H1 and the output shaft H2 are respectively provided with a first end surface bearing 7 and a tumbler bearing 6. An isolating sleeve 13 is arranged between the tumbler bearing 6 and the first end surface bearing 7 on the input shaft H1, and an isolating sleeve 13 is arranged between the tumbler bearing 6 and the first end surface bearing 7 on the output shaft H2. The tumbler bearings 6 and the first end surface bearings 7 are separated through the isolating sleeves 13, so that the tumbler bearings 6 and the first end surface bearings 7 do not interfere with each other, which is beneficial to normal operation. The input shaft H1 is supported on the right-end disk 1 through the first end surface bearing 7, and the input shaft H1 is in transmission connection with the right planetary gear 2 through the tumbler bearing 6; and the input shaft H1 drives the right planetary gear 2 through the tumbler bearing 6. The output shaft H2 is supported on the left-end disk 4 through the first end surface bearing 7, and the output shaft H2 is in transmission connection with the left planetary gear 5 through the tumbler bearing 6; and the left planetary gear 5 drives the output shaft H2 through the tumbler bearing 6. The present invention does not specifically limit the tooth profile of each gear, and common involute and cycloid pin gears can be adopted.

The connection member 8 may be a connection pin. As shown in FIG. 1, one end of the connection member 8 axially runs through the left planetary gear 5 and the right planetary gear 2; the end part of one end of the connection member 8 is fixedly connected to the left-end disk 4 through a screw 9 and a spacer 10; the end part of the other end of the connection member 8 is also fixedly connected to the right-end disk 1 through the screw 9 and the spacer 10; and the left-end disk 4 and the right-end disk 1 are synchronously operated through the connection member 8. The gear tooth profile on the left-end disk 4 is processed on the right end surface, and the gear tooth profile on the right-end disk 1 is processed on the left end surface. The left planetary gear 5 and the right planetary gear 2 are duplex gears, wherein eccentric directions of two duplex gears on the left planetary gear 5 have a difference of 180°; and eccentric directions of two duplex gears on the right planetary gear 2 have a difference of 180°.

Duplex internal gears are processed on the inner surface of the housing 3. The duplex internal gears on the inner surface of the housing 3 are respectively located on the left end and the right end of the inner surface of the housing 3. The left planetary gear 5 is simultaneously engaged with the tooth profile on the left end of the housing 3 and the tooth profile on the left-end disk 4. The right planetary gear 2 is simultaneously engaged with the tooth profile on the right end of the housing 3 and the tooth profile on the right-end disk 1. The duplex gears on the left planetary gear 5 and the right planetary gear 2 are external gears, and the gears disposed on the end surfaces of the left-end disk 4 and the right-end disk 1 are internal gears; or the gears, engaged with the left-end disk 4, in the duplex gears on the left planetary gear 5 are internal gears, and the gears, engaged with the inner surface of the housing 3, in the duplex gears on the left planetary gear 5 are external gears; the gears, engaged with the right-end disk 1, in the duplex gears on the right planetary gear 2 are internal gears, and the gears, engaged with the inner surface of the housing 3, in the duplex gears on the right planetary gear 2 are external gears. The gears disposed on the end surfaces of the left-end disk 4 and the right-end disk 1 are external gears. In the present embodiment, preferably, the duplex gears on the left planetary gear 5 and the right planetary gear 2 are external gears, and the gears disposed on the end surfaces of the left-end disk 4 and the right-end disk 1 are internal gears. The left-end disk 4 is supported on the left end of the internal gears of the housing 3 through a second end surface bearing 11, and the right-end disk 1 is supported on the right end of the internal gears of the housing 3 through the second end surface bearing 11.

The working process is: the input shaft H1 drives the right planetary gear 2 to operate through the tumbler bearing 6; the right planetary gear 2 drives the housing 3 and the right-end disk 1 to operate; the right-end disk 1 drives the left-end disk 4 to operate through the connection member 8; the housing 3 and the left-end disk 4 simultaneously drive and adjust the operation condition of the left planetary gear 5; and the left planetary gear 5 drives the output shaft H2 to operate through the tumbler bearing 6. By means of the force closure mechanism formed by the left-end disk 4, the right-end disk 1, the left planetary gear 5, the right planetary gear 2 and the housing 3, the transmission device can automatically adjust the transmission ratio and the output rotation speed according to the load of the input shaft H1 and has a simple structure, high transmission efficiency and low cost.

In the present invention, tooth number relationships of the gears on the force closure mechanism are:

$$(z_1 z_{23} - z_{21} z_{32})(z_4 - z_{54})(z_{54} + z_{53}) = (z_4 z_{53} - z_{54} z_{35})(z_1 - z_{31})(z_{21} + z_{23}) \quad (1)$$

$$z_{32} = z_1 - z_{21} + z_{23} \quad (2)$$

$$z_{35} = z_4 - z_{54} + z_{53} \quad (3)$$

wherein $z_1$ is the tooth number of the gears on the right-end disk; $z_{21}$ is the tooth number of the gears, engaged with the right-end disk, on the right planetary gear; $z_{23}$ is the tooth number of the gears, engaged with the housing, on the right planetary gear; $z_{32}$ is the tooth number of the gears, engaged with the right planetary gear, on the housing; $z_{35}$ is the tooth number of the gears, engaged with the left planetary gear, on the housing; $z_4$ is the tooth number of the gears on the left-end disk; $z_{53}$ is the tooth number of the gears, engaged with the housing, on the left planetary gear; and $z_{54}$ is the tooth number of the gears, engaged with the left-end disk, on the left planetary gear.

The working principle, when the tooth number of the gears on the force closure mechanism satisfies tooth number relationships in formula (1), formula (2) and formula (3), is described below in detail. Meanwhile, the duplex gears on the left planetary gear 5 and the right planetary gear 2 are external gears, and the gears disposed on the end surfaces of the left-end disk 4 and the right-end disk 1 are internal gears so as to fully comprehend the technical solution. It is assumed that $M_{H1}$ is the input torque; $M_{H2}$ is the workload torque; $M_{H2max}$ is the maximum allowable workload torque; $\omega_{H1}$ is the rotation speed of the input shaft H1; $\omega_{H2}$ is the rotation speed of the output shaft H2; $\omega_1$, $\omega_2$, $\omega_3$, $\omega_4$ and $\omega_5$ are respectively the rotation speeds of the right-end disk 1, the right planetary gear 2, the housing 3, the left-end disk 4 and the left planetary gear 5; $r_{H1}$ and $r_{H2}$ are respectively eccentric distances of the tumbler of the input shaft H1 and the tumbler of the output shaft H2; $r_1$ is a pitch circle radius of the gears on the right-end disk 1; $r_{32}$ is a pitch circle radius of the gears, engaged with the right planetary gear 2, on the housing 3; $r_{35}$ is a pitch circle radius of the gears, engaged with the left planetary gear 5, on the housing 3; and $r_4$ is a pitch circle radius of the gears on the left-end disk 4.

When the left-end disk 4 and the right-end disk 1 have a rotation speed of 0, i.e., $\omega_1 = 0$, the corresponding transmission ratio and workload are $$u^{(\omega_1)} = \frac{z_1 z_{23}(z_4 - z_{54})(z_{54} + z_{53})}{z_4 z_{53}(z_1 - z_{21})(z_{21} + z_{23})} \quad (4)$$

$$M_{H2}^{(\omega_1)} = M_{H1} u^{(\omega_1)} \quad (5)$$

When the housing has a rotation speed of 0, i.e., $\omega_3 = 0$, the corresponding transmission ratio and workload are $$u^{(\omega_3)} = \frac{z_{21} z_{32}(z_4 - z_{54})(z_{54} + z_{53})}{z_{54} z_{35}(z_1 - z_{21})(z_{21} + z_{23})} \quad (6)$$

$$M_{H2}^{(\omega_3)} = M_{H1} u^{(\omega_3)} \quad (7)$$

Then, the maximum allowable workload $M_{H2max}$ is insufficient to overcome the friction between internal components and outputs a load with a rotation speed of 0, and has the following relationship with $M_{H2}^{(\omega_1)}$ and $M_{H2}^{(\omega_3)}$:

$$M_{H2max} > \max\{M_{H2}^{(\omega_1)}, M_{H2}^{(\omega_3)}\} \quad (8)$$

When $M_{H1} \leq M_{H2} \leq H_{2max}$, the transmission device automatically adjusts the transmission ratio and the output rotation speed according to the workload $H_{H2}$, and the rotation speed and the transmission ratio of the output shaft H2 are:

$$\omega_{H2} = \frac{M_{H1} \omega_{H1}}{M_{H2}} \quad (9)$$

-continued $$u = \frac{\omega_{H1}}{\omega_{H2}} = \frac{M_{H2}}{M_{H1}} \quad (10)$$

The rotation speeds of the left-end disk 4 and the right-end disk 1 are $$\omega_1 = \omega_4 = u_{13}^{(H1)}(\omega_3 - \omega_{H1}) + \omega_{H1} \quad (11)$$

The rotation speed of the housing 3 is $$\omega_3 = \frac{\omega_{H2}(1 - u_{43}^{(H2)}) - \omega_{H1}(1 - u_{13}^{(H1)})}{u_{13}^{(H1)} - u_{43}^{(H2)}} \quad (12)$$

$u_{13}^{(H1)}$ is the transmission ratio of the internal gears of the right-end disk 1 and the housing 3 relative to the input shaft H1; $H_{43}^{(H2)}$ is the transmission ratio of the internal gears of the left-end disk 4 and the housing 3 relative to the output shaft H2, i.e., $$u_{13}^{(H1)} = \frac{z_{21} z_{32}}{z_1 z_{23}} \quad (13)$$

$$u_{43}^{(H2)} = \frac{z_{54} z_{35}}{z_4 z_{53}} \quad (14)$$

When $M_{H2} = M_{H2}^{(\omega_1)}$, rotation directions of the left-end disk 4 and the right-end disk 1 are changed. When $M_{H2} = M_{H2}^{(\omega_3)}$, the rotation direction of the housing 3 is changed. When $M_{H2} > M_{H2max}$ it is an overloading region; an ideal output rotation speed is very low and is insufficient to overcome mutual friction between components; a practical output rotation speed is 0; and automatic protection and shutdown are realized.

The standard for verifying whether the power is closed is: fictitious powers applied to the left-end disk, the right-end disk 1 and the housing 3 are always equal, with a formula as follows $$M_1 \omega_1 = M_3 \omega_3 \quad (15)$$

$M_1$ is the torque applied to the left-end disk 4 and the right-end disk 1.

$$M_1 = M_{H1}\left[\frac{z_1 z_{23}}{(z_1 - z_{21})(z_{21} + z_{23})} - u\frac{z_4 z_{53}}{(z_4 - z_{54})(z_{54} + z_{53})}\right] \quad (16)$$

$M_3$ is the torque applied to the housing 3.

$$M_3 = M_{H1}\left[\frac{z_{21} z_{32}}{(z_1 - z_{21})(z_{21} + z_{23})} - u\frac{z_{54} z_{35}}{(z_4 - z_{54})(z_{54} + z_{53})}\right] \quad (17)$$

In the present invention, the gears on the end surfaces of the right-end disk 1 and the left-end disk 4 can also be external gears; correspondingly, the gears in the duplex gears, engaged with the right planetary gear 2 and the left planetary gear 5, on the right planetary gear 2 and the left planetary gear 5 are internal gears. The principle is identical and will not be repeated herein. To clearly indicate the principle of the present invention, the above formulas are used for an ideal transmission device without considering transmission loss. For a practical transmission device that considers the transmission loss, only coefficients in the above formulas are modified using the transmission efficiency. The principle is identical and will not be repeated herein.

The embodiments of the present invention are illustrated below through specific values, but are not limited to the following embodiments.

Embodiment 1

The gears processed on the end surfaces of the right-end disk 1 and the left-end disk 4 are internal gears; the duplex gears on the right planetary gear 2 and the left planetary gear 5 are external gears; and tooth profile curves of the gears on the right-end disk 1, the left-end disk 3, the right planetary gear 2 and the left planetary gear 5 are involutes.

The eccentric distances are $r_{H1}$=0 0.5 mm and $r_{H2}$=2.5 mm

The tooth numbers are $z_1$=66, $z_{21}$=65, $z_{23}$=130, $z_{32}$=131, $z_{35}$=27 $z_4$=14, $z_{53}$=26 and $z_{54}$=13

Moduli are $m_1 = m_{21} = m_{23} = m_{32}$=1 mm and $m_{35} = m_{53} = m_{54} = m_4$=5 mm The input rotation speed and the torques are $\omega_{W1}$=100 rad/s, $M_{H1}$=50N·m and $M_{H2max}$=1000N·m Then, tooth number relationships of the gears are as follows $(z_1 z_{23} - z_{21} z_{32})(z_4 - z_{54})(z_{54} + z_{53})$=(66×130−65×131)× (14−13)×(13+26)=2535

$(z_4 z_{53} - z_{54} z_{35})(z_1 - z_{21})(z_{21} + z_{23})$=(14×26−13×27)×(66− 65)×(65+130)=2535

Then $(z_1 z_{23} - z_{21} z_{32})(z_4 - z_{54})(z_{54} + z_{53})$=$(z_4 z_{53} - z_{54} z_{35})(z_1 - z_{21})(z_{21} + z_{23})$ $z_1 - z_{21} + z_{23}$=66−65+130=13 1=$z_{32}$ $z_4 - z_{54} + z_{53}$=14−13+26=27=$z_{35}$ It is seen from above computation that the relationships of tooth numbers of the gears satisfy the force closure condition.

When the left-end disk and the right-end disk have a rotation speed of 0, i.e., $\omega_1$=0, the transmission ratio and the output torque are $$u^{(\omega 1)} =$$

$$\frac{z_1 z_{23}(z_4 - z_{54})(z_{54} + z_{53})}{z_4 z_{53}(z_1 - z_{21})(z_{21} + z_{23})} = \frac{66 \times 130 \times (14-13) \times (13+26)}{14 \times 26 \times (66-65) \times (65+130)} = 4.7143$$

$$M_{H2}^{(\omega 1)} = M_{H1} u^{(\omega 1)} = 50 \times 4.7143 = 235.71 \text{ N·m}$$

When the housing has a rotation speed of 0, i.e., $\omega_3$=0, the transmission ratio and the output torque are $$u^{(\omega 3)} =$$

$$\frac{z_{21} z_{32}(z_4 - z_{54})(z_{54} + z_{53})}{z_{54} z_{35}(z_1 - z_{21})(z_{21} + z_{23})} = \frac{65 \times 131 \times (14-13) \times (13+26)}{13 \times 27 \times (66-65) \times (65+130)} = 4.8519$$

$$M_{H2}^{(\omega 3)} = M_{H1} u^{(\omega 3)} = 50 \times 4.8519 = 242.59 \text{ N·m}$$

Figure 2:
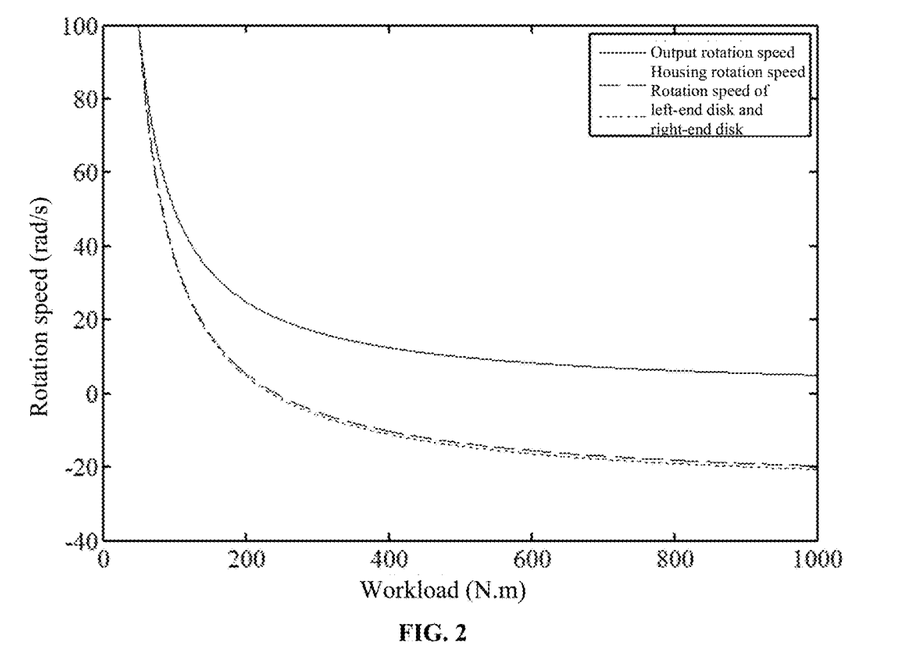
FIG. 2 is a rotation speed-torque diagram of an embodiment of the present invention.
Figure 3:
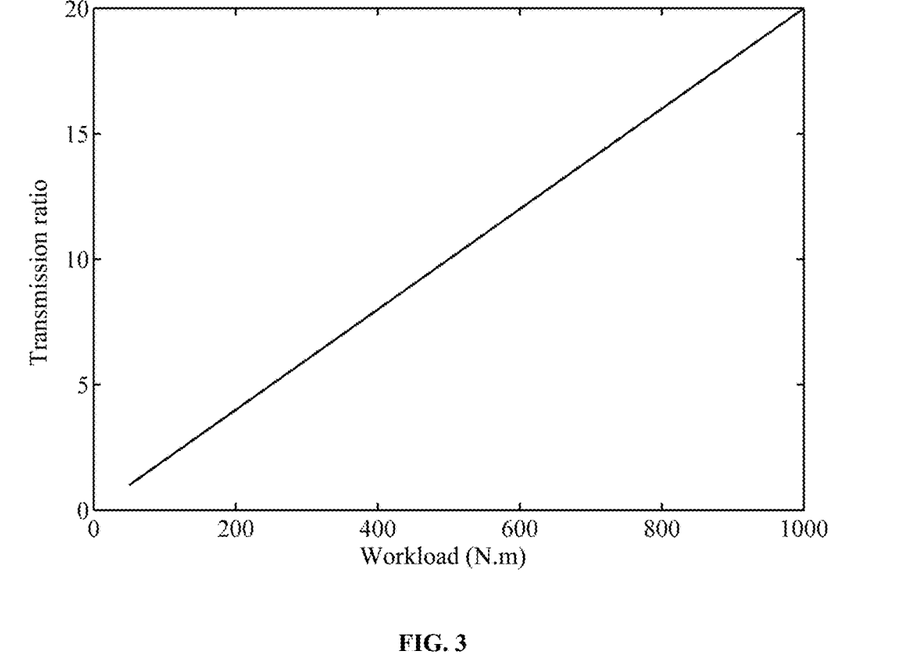
FIG. 3 is a transmission ratio-torque diagram of an embodiment of the present invention.
Figure 4:
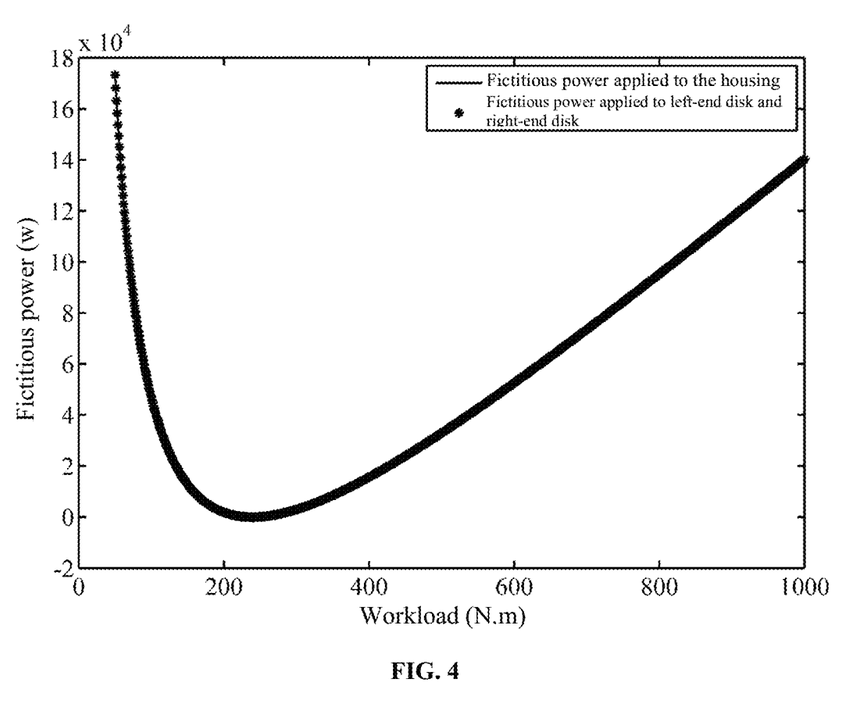
FIG. 4 is a power closure verification diagram of an embodiment of the present invention.

It is seen from the rotation speed-torque diagram in the embodiment shown in FIG. 2 that, when the workload satisfies 50 N·m≤$M_{H2}$≤1000 N·m, it is a normal working area and the output rotation speed is automatically adjusted according to the change in the workload. When $M_{H2}$=235.71 N·m, rotation directions of the left-end disk 4 and the right-end disk 1 are changed. When $M_{H2}$=242.59 N·m, the rotation direction of the housing 3 is changed. When $M_{H2}$>1000 N·m, it is an overloading region and an ideal output rotation speed is very low. Considering mutual friction between components, a practical output rotation speed is 0 and automatic protection and shutdown are realized. It is seen from the transmission ratio-torque diagram in the embodiment shown in FIG. 3 that, the transmission ratio is continuously variable and is smooth in transmission in a manner of stepless speed regulation. In the power closure verification diagram in the embodiment shown in FIG. 4, fictitious powers applied to the left-end disk, the right-end disk and the housing are always equal, and the power closure structure is verified.

The present invention does not depend on the measurement and control system in the normal working area, and only depends on the characteristic of its mechanism so that the output rotation speed can be automatically adjusted according to the change in the workload; the adjustment manner is stepless speed change, thereby realizing smooth transmission. In the overloading region, the output rotation speed is 0 and automatic shutdown and protection are realized. During automatic protection, the rotation speed and the torque of the input shaft are unchanged. Thus, when the workload is less than the largest output load, the transmission device can be automatically recovered to operate to realize normal transmission.

The above embodiments are only used for exemplarily describing the principles and effects of the present invention rather than limiting the present invention. Any of those skilled in the art can modify or change the above embodiments without deviating from spirits and categories of the present invention. Therefore, all equivalent modifications or changes completed by ordinary intellectuals in the technical field without departing from spirits and technical thoughts revealed in the present invention shall still be covered by claims of the present invention.

The invention claimed is:

1. A smart self-adaptive planetary transmission device with a tooth number difference, comprising a left planetary gear, a right planetary gear, a left-end disk, a right-end disk, a housing and a connection member, wherein an end of the connection member sequentially runs through the left planetary gear and the right planetary gear in an axial direction; end parts of both ends of the connection member are fixedly connected to the left-end disk and the right-end disk respectively; the left planetary gear is engaged with both a tooth profile on the left-end disk and a tooth profile on the housing; the right planetary gear is engaged with a tooth profile on the right-end disk and the tooth profile on the housing wherein the transmission device further comprises an input shaft and an output shaft; the input shaft is supported on the right-end disk through a first end surface bearing, and the input shaft is in transmission connection with the right planetary gear through a tumbler bearing; and the output shaft is supported on the left-end disk through the first end surface bearing, and the output shaft is in transmission connection with the left planetary gear through the tumbler bearing.

2. The smart self-adaptive planetary transmission device with the tooth number difference according to claim 1, wherein an isolating sleeve is arranged between the tumbler bearing and the first end surface bearing.

3. The smart self-adaptive planetary transmission device with the tooth number difference according to claim 1, wherein the housing, the left planetary gear and the right planetary gear are duplex gears.

4. The smart self-adaptive planetary transmission device with the tooth number difference according to claim 3, wherein eccentric directions of the duplex gears on the left planetary gear and the right planetary gear have a difference of 180°.

5. The smart self-adaptive planetary transmission device with the tooth number difference according to claim 4, wherein gear tooth profiles of the left-end disk are disposed on end surface that matches with the left planetary gear; and the right-end disk are disposed on end surfaces that matches with the right planetary gear.

6. The smart self-adaptive planetary transmission device with the tooth number difference according to claim 5, wherein the duplex gears on the left planetary gear and the right planetary gear are external gears, and the gears disposed on the end surfaces of the left-end disk and the right-end disk are internal gears; or the gears on the left planetary gear engaged with the left-end disk and the gears on the right planetary gear engaged with the right-end disk are internal gears, and the gears disposed on the end surfaces of the left-end disk and the right-end disk are external gears.

7. The smart self-adaptive planetary transmission device with the tooth number difference according to claim 1, wherein the connection member is a connection pin; one end of the connection pin axially runs through the left planetary gear and the right planetary gear, and both ends of the connection pin are fixedly connected to the left-end disk and the right-end disk respectively.

8. The smart self-adaptive planetary transmission device with the tooth number difference according to claim 1, wherein the left-end disk and the right-end disk are respectively supported on the internal gears of the housing through a second end surface bearing.

9. A smart self-adaptive planetary transmission device with a tooth number difference, comprising a left planetary gear, a right planetary gear, a left-end disk, a right-end disk, a housing and a connection member, wherein an end of the connection member sequentially runs through the left planetary gear and the right planetary gear in an axial direction; end parts of both ends of the connection member are fixedly connected to the left-end disk and the right-end disk respectively; the left planetary gear is engaged with both a tooth profile on the left-end disk and a tooth profile on the housing; the right planetary gear is engaged with a tooth profile on the right-end disk and the tooth profile on the housing; wherein the left planetary gear, the right planetary gear, the left-end disk, the right-end disk and the housing form a force closure mechanism, tooth number relationships of the gears on the force closure mechanism are:

$$(z_1 z_{23} - z_{21} z_{32})(z_4 - z_{54})(z_{54} + z_{53}) = (z_4 z_{53} - z_{54} z_{35})(z_1 - z_{31})(z_{21} + z_{23});$$

$$z_{32} = z_1 - z_{21} + z_{23};$$

$$z_{35} = z_4 - z_{54} + z_{53};$$

wherein $z_1$ is the tooth number of the gems on the right-end disk; $z_{21}$ is the tooth number of the gems, engaged with the right-end disk, on the right planetary gear; $z_{23}$ is the tooth number of the gems, engaged with the housing, on the right planetary gear; $z_{32}$ is the tooth number of the gems, engaged with the right planetary gear, on the housing; $z_{35}$ is the tooth number of the gears, engaged with the left planetary gear, on the housing; $z_4$ is the tooth number of the gears on the left-end disk; $z_{53}$ is the tooth number of the gears, engaged with the housing, on the left planetary gear, and $z_{54}$ is the tooth number of the gems, engaged with the left-end disk, on the left planetary gear.

* * * * *